(12) United States Patent
Eschbach

(10) Patent No.: US 6,718,051 B1
(45) Date of Patent: Apr. 6, 2004

(54) RED-EYE DETECTION METHOD

(75) Inventor: Reiner Eschbach, Webster, NY (US)

(73) Assignee: Xerox Corporation, Stamford, CT (US)

(*) Notice: Subject to any disclaimer, the term of this patent is extended or adjusted under 35 U.S.C. 154(b) by 630 days.

(21) Appl. No.: 09/688,673

(22) Filed: Oct. 16, 2000

(51) Int. Cl.⁷ ................................................ G06K 9/00
(52) U.S. Cl. ...................................... 382/117; 382/162
(58) Field of Search ................................. 382/117, 162, 382/164, 165, 167, 218; 358/487, 500, 515, 518, 523, 530; 430/357, 359, 362, 364; 396/61, 62, 104, 121, 123, 165, 203

(56) References Cited

U.S. PATENT DOCUMENTS

| | | | |
|---|---|---|---|
| 5,130,789 A | | 7/1992 | Dobbs et al. ................ 358/500 |
| 5,136,312 A | * | 8/1992 | Weaver et al. ................ 396/61 |
| 5,153,632 A | | 10/1992 | Maida et al. ................. 396/61 |
| 5,202,719 A | | 4/1993 | Taniguchi et al. ............ 396/61 |
| 5,287,134 A | * | 2/1994 | Cocca ........................ 396/203 |
| 5,315,342 A | * | 5/1994 | Cocca ........................ 396/104 |
| 5,404,192 A | | 4/1995 | Konishi et al. ............. 396/123 |
| 5,432,863 A | | 7/1995 | Benati et al. ................ 382/167 |
| 5,500,671 A | | 3/1996 | Andersson et al. ......... 348/14.1 |
| 5,666,215 A | | 9/1997 | Fredlund et al. ............ 358/487 |
| 5,698,379 A | | 12/1997 | Bohan et al. ................ 430/359 |
| 5,717,964 A | * | 2/1998 | Dowe ......................... 396/165 |
| 5,747,228 A | | 5/1998 | Bohan et al. ................ 430/380 |
| 5,748,764 A | | 5/1998 | Benati et al. ................ 382/117 |
| 5,804,356 A | | 9/1998 | Cole et al. .................. 430/359 |
| 5,840,470 A | | 11/1998 | Bohan et al. ................ 430/359 |
| 5,990,973 A | | 11/1999 | Sakamoto .................... 348/576 |
| 6,016,354 A | | 1/2000 | Lin et al. .................... 382/117 |
| 6,151,403 A | * | 11/2000 | Luo ............................ 382/117 |

FOREIGN PATENT DOCUMENTS

| | | | |
|---|---|---|---|
| WO | WO 97/21188 | 6/1997 | ............ G06K/9/00 |
| WO | WO 99/17254 | 4/1999 | ............ G06T/5/20 |

OTHER PUBLICATIONS

Haro et al., Detecting and Tracking Eyes by Using Their Physiological Properties, Dynamics, and Appearance, IEEE (2000), pps. 163–168 (Document No. XP001035597).

* cited by examiner

Primary Examiner—Andrew W. Johns
Assistant Examiner—Amir Alavi
(74) Attorney, Agent, or Firm—Fay, Sharp, Fagan, Minnich & McKee, LLP

(57) ABSTRACT

A red-eye detection method includes receiving digital image data that defines an image. The digital image data are processed to identify all regions of the image that include a specular reflection. Image regions deemed to include a specular reflection are processed further, according to conventional techniques, to determine the presence or absence of red-eye. Specular reflections are identified according to luminace-chrominance characteristics, geometric (e.g., size/shape) characteristics, and/or luminance gradient characteristics.

11 Claims, 3 Drawing Sheets

RED-EYE DETECTION METHOD

BACKGROUND OF THE INVENTION

The present invention relates to a novel and non-obvious image processing method for detecting potential red-eye in an image. The invention is not directed to a method for correcting red-eye once detected, as numerous red-eye correction methods are well known in the art. The present invention provides a faster and more accurate red-eye detection method or potential red-eye detection method without operator intervention, and is adapted for use upstream relative to a conventional red-eye detection/correction system.

Red-eye is a common phenomenon apparent in photographic images (whether continuous tone or digital) taken using a flash or strobe, wherein a human subject's eyes appear "blood red" instead of their natural color. Red-eye is caused by a reflection of the flash light from the retina of the eye back into the objective lens of the camera.

Red-eye has become more prevalent and severe as cameras have been made smaller with integrated flashes. The small size coupled with the built-in nature of the flash requires placement of the flash in close proximity the objective lens. Thus, a greater portion of the reflected light from a subject's retinas enters the object lens and is recorded. Recognizing this problem, camera manufacturers have attempted to minimize or inhibit red-eye by equipping cameras with the ability to emit one or more pre-flashes of light immediately prior to completion of the actual photograph. These pre-flashes are intended to constrict the subject's pupils to minimize light incident on the retina and reflected therefrom. While these modern cameras do reduce the occurrence of red-eye, it continues to be a common and bothersome occurrence.

As noted above, image processing techniques are known and utilized to detect and correct red-eye. Prior methods are disclosed, for example, in the following U.S. Patents, the disclosures of which are hereby expressly incorporated by reference: U.S. Pat. Nos. 5,990,973; 5,130,789; 6,016,354; 5,153,632; 5,202,719; 5,404,192; 5,432,863; 5,666,215; 5,698,379; 5,747,228; 5,748,764; 5,804,356; and, 5,840,470.

In general, conventional image processing techniques for detecting or identifying red-eye have required human intervention or have been highly inefficient in terms of required image processing operations. In one prior method, an operator must visually scan all images and mark those images including red-eye for further processing. This is time-consuming and expensive. Attempts to eliminate or reduce operator involvement have resulted in automated processes that attempt to detect red-eye based upon color, size, and shape criteria. Given that the color red is very common, and given that red-eye is not present in a great many images (e.g., those not taken using a flash, those not including human subjects, etc.) vast amounts of image processing resources are used inefficiently for this purpose. Furthermore, false-positives are common owning to the fact that every red object satisfying the size/shape criteria will be identified as red-eye. Thus, red buttons, a piece of red candy, etc., all may be misidentified as red-eye using these prior automated red-eye detection techniques.

In light of the foregoing specifically noted deficiencies and others associated with conventional red-eye detection techniques, it has been deemed desirable to develop and novel and non-obvious red-eye detection technique that overcomes these deficiencies while providing better overall results.

SUMMARY OF THE INVENTION

In accordance with the present invention, a red-eye detection method includes receiving digital image data that defines an image. The digital image data are processed to identify all regions of the image that include a specular reflection. Image regions deemed to include a specular reflection are processed further, according to conventional techniques, to determine the presence or absence of red-eye. Specular reflections are identified according to luminace-chrominance characteristics, geometric (e.g., size/shape) characteristics, and/or luminance gradient characteristics.

One advantage of the present invention is the provision of an automated red-eye detection method that requires less image processing resources relative to conventional automated red-eye detection methods.

Another advantage of the present invention resides in the provision of a red-eye detection method that first identifies image regions that potentially include red-eye incorporating less resource intensive methods, wherein intensive image processing for red-eye detection is performed on these areas only.

A further advantage of the present invention is found in the provision of a red-eye detection method wherein color is not or not dominantly used as an indication of an image region potentially including red-eye.

Still another advantage of the present invention is found in the provision of a red-eye detection method that identifies potential red-eye regions of an image upstream from a conventional red-eye detection and/or correction system.

Still other benefits and advantages of the present invention will become apparent to those of ordinary skill in the art to which the invention pertains upon reading the following specification.

BRIEF DESCRIPTION OF THE DRAWINGS

The invention comprises a plurality of steps and arrangements of steps, a preferred embodiment of which is disclosed herein with reference to the accompanying drawings that form a part hereof and wherein.

DETAILED DESCRIPTION OF THE PREFERRED EMBODIMENT

Figure 1:
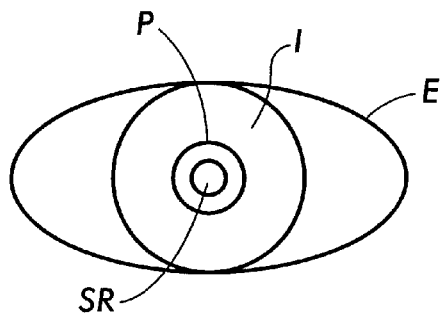
FIG. 1 is a diagrammatic illustration of a human eye exhibiting the red-eye phenomenon.

Referring now to the drawings, wherein the showings are for the purpose of illustrating a preferred embodiment of the invention only and not for limiting same, FIG. 1 diagrammatically illustrates a human eye E including an iris I, and a pupil P, both of which are covered by a transparent cornea. For the purpose of this description, we will assume that the image of the eye contains said red-eye effect. This effect is caused by the reflection of the flash light from the retina at the back of the eye. Considering the shape of a human eye, one can deduce that a reflection from the front of the eye should also be visible in close spatial proximity to the reflection from the back side of the eye. The front side reflection is a reflection from a smooth, moist surface, thereby exhibiting all characteristics of a specular reflection. The illustrated eye E also exhibits a specular reflection SR, in the example overlapping with the spatial extent of the pupil P. The specular reflection is a brilliant, essentially "white" area that results from the reflection of a photographic flash or strobe from the cornea of the eye. As is well known, red-eye is evidenced by a blood red color of the pupil P in an image.

Figure 2:
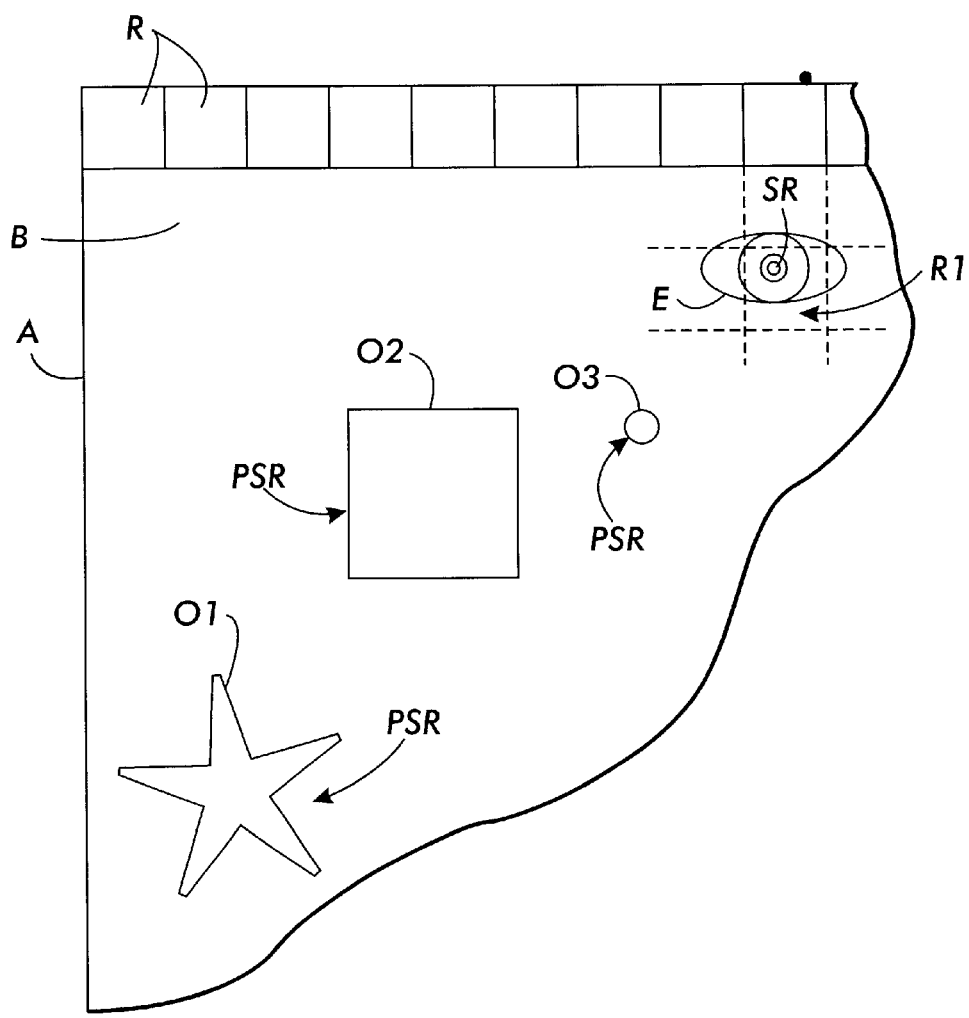
FIG. 2 is a partial diagrammatic illustration of a image including the eye of FIG. 1 and other objects.

FIG. 2 illustrates a partial image A defined by a background B, a first object O1, a second object O2, a third object O3, and the eye E described above. The image is preferably provided in digital form or, if not, is converted from continuous tone data to digital data for processing in accordance with the present invention. Most preferably, the image data is digital image data defined by a plurality of pixel values expressed in terms of a luminance-chrominance color space or converted into a luminance-chrominance color space such as YCrCb, CIELAB or the like.

Figure 3:
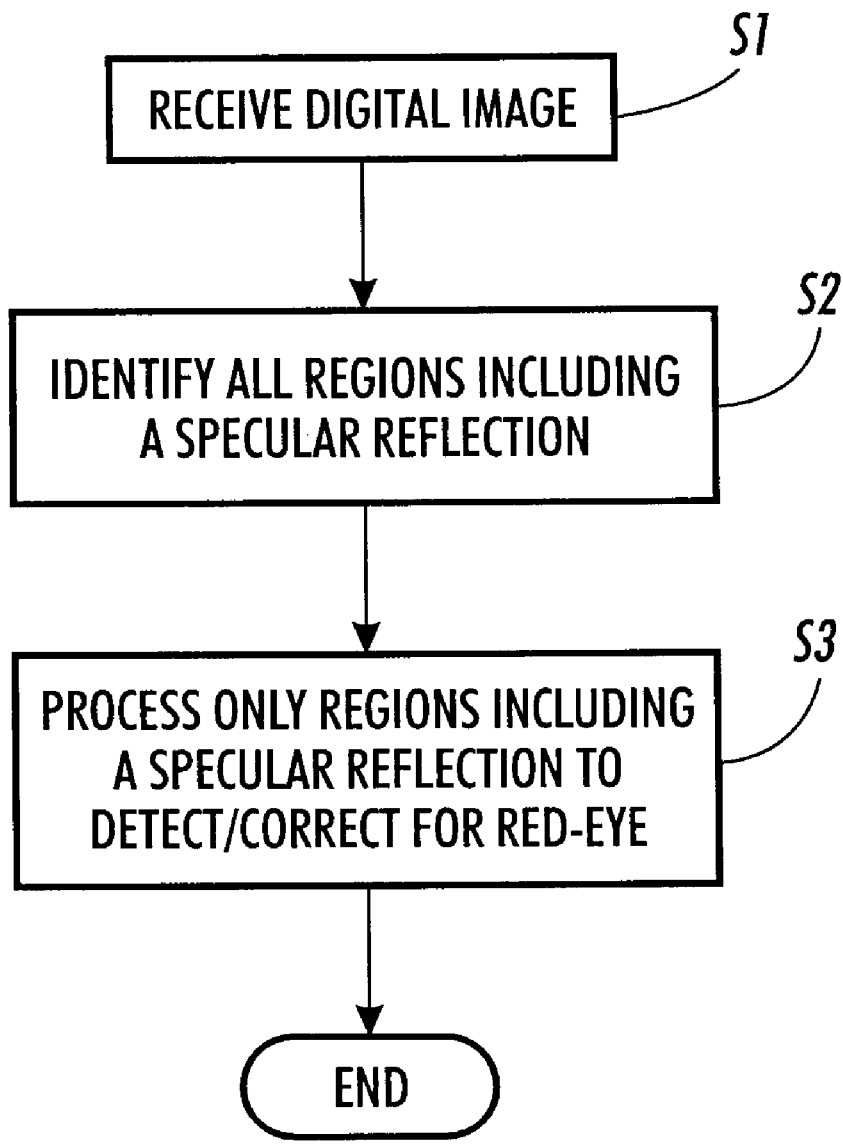
FIG. 3 is a high-level flow chart that discloses a red-eye detection method in accordance with the present invention; and, FIG. 4 is a more detailed flow chart illustrating sub-steps of the red-eye detection method disclosed in FIG. 3.

Referring now also to FIG. 3, the red-eye detection method in accordance with the present invention is disclosed. The method is implemented on any suitable image processing or photofinishing apparatus and includes a step S1 of receiving digital image data that defines an image, e.g., the image A. A step S2 includes processing the digital image data to identify all regions R thereof that include a specular reflection SR. Finally, in step S3, only those regions R that are deemed to include a specular reflection SR are processed further, according to conventional techniques, to determine the presence or absence of red-eye. Thus, with reference to FIG. 2, the step S2 would result in a region R1 (shown in broken lines for clarity) being identified as the only region R of the image A including a specular reflection SR.

Those of ordinary skill in the art will recognize that the present invention capitalizes on the fact that essentially all red-eye is associated with a specular reflection SR, i.e., without a specular reflection, there will be no red-eye. On the other hand, the presence of a specular reflection does not necessarily indicate the presence of red-eye. In fact, many times a specular reflection SR will be present without red-eye. Thus, further conventional processing of the regions R identified as including a specular reflection SR is required to determine the presence or absence of red-eye associated with the specular reflection SR in the region R. Conventional processing to detect and correct red-eye within each region R including a specular reflection SR is carried out by any suitable method, such as those set forth in the above-identified prior patents. Often, these methods identify red-eye based upon locating an image feature or object having a particular red color with a particular size and shape corresponding to the size and shape of a human pupil P.

Figure 4:
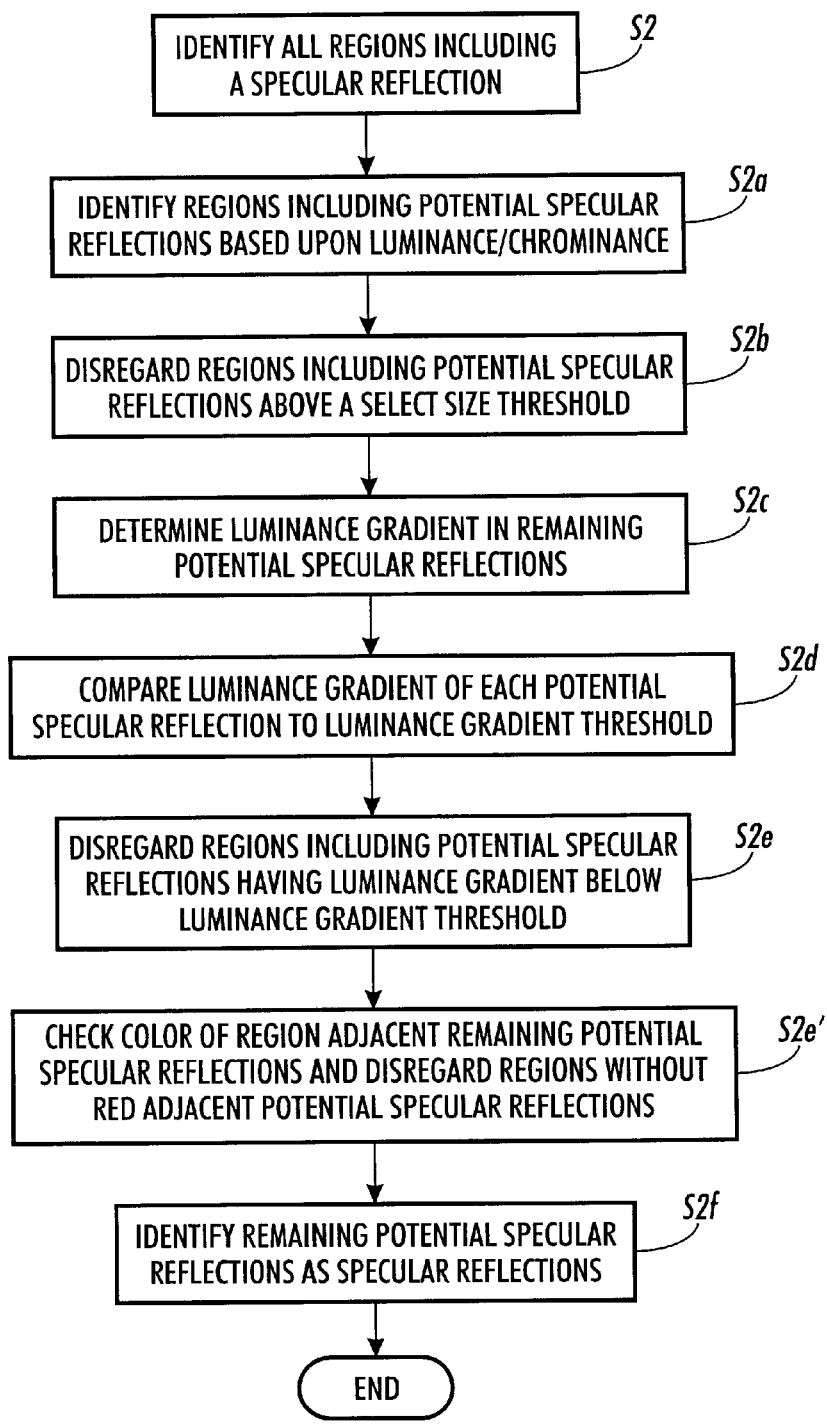

The step S2 of identifying all regions R including a specular reflection SR includes a plurality of sub-steps S2a–S2f in accordance with the present invention as disclosed in FIG. 4. Those of ordinary skill in the art will recognize that some of the steps set forth in FIG. 4 can be carried out in an order different from that specified herein without departing from the overall scope and intent of the present invention.

The sub-step S2a includes processing the data or pixels defining the image A and identifying all regions R including potential specular reflections PSR based upon luminance-chrominance data, i.e., all bright white regions are identified as potential specular reflections PSR. In one example, using the YCrCb 8 bit/separation color space description, such bright white regions can be identified by locating a group of adjacent pixels satisfying all of the following relationships: $Y>220$; $-16<Cb<16$; and, $-8<Cr<24$. For example, in FIG. 2, the specular reflection SR would be identified as a potential specular reflection. Also, for example, the objects O1–O3 would also be identified as a potential specular reflection based upon their bright white luminance-chrominance characteristics.

A sub-step S2b then compares each potential specular reflection PSR to a geometric attribute, for example a desired shape and/or size. For simplicity of processing in the description, the PSR is compared to a selected size threshold, e.g. pixel height and width values above which the potential specular reflection is deemed too large to be a specular reflection. Thus, with reference to the image A in FIG. 2, the object O1 and O2 exceed the size threshold and are discarded from the set of potential specular reflections. After the step S2b only the object O3 and the actual specular reflection SR are still identified as potential specular reflections PSR.

A sub-step S2c determines the luminance gradient for each potential specular reflection PSR. This is accomplished, for example, using subtraction across the spatial extent of the potential specular reflection PSR. The luminance gradient is defined herein as the rate of change of luminance within each potential specular reflection PSR. An actual specular reflection SR exhibits a strong luminance gradient as opposed to other bright white image regions such as ordinary white objects.

The sub-step 52d compares the brightness or luminance gradient of all potential specular reflections PSR to a select luminance gradient threshold. A step S2e discards from the set of all potential specular reflections those not exhibiting a luminance gradient above the select luminance gradient threshold. In the present example, the object O3 in the image A is a white button or the like, and is not defined by a sufficiently strong luminance gradient to satisfy the luminance gradient threshold applied by the sub-step S2d and will thereafter be disregarded according to the sub-step S2e.

The sub-step S2f identifies all remaining potential specular reflections PSR as specular reflections SR. In the present example, the sub-step S2f identifies only the actual specular reflection SR as a specular reflection. If desired, an optional sub-step S2e can be provided before the sub-step S2f. The sub-step S2e looks for red colored pixels adjacent the potential specular reflection PSR. If none are identified, the potential specular reflection is disregarded and not identified as a specular reflection SR. In such case, given that no red colored pixels are located adjacent the potential specular reflection, further processing to locate red-eye associated with a specular reflection is unnecessary.

It should be noted that false positives (i.e., identifying a region R as including a specular reflection SR when it does not, in fact include a specular reflection) are possible and even desirable. The downstream conventional red-eye detection and correction processing performed on the regions identified as including red-eye will identify those regions not actually including red-eye and will disregard same. On the other hand, by biasing the foregoing method toward identifying potential specular reflections as specular reflections, the likelihood of missing an occurrence of red-eye is minimized.

Those of ordinary skill in the art will recognize that the in cases where the region identification and subsequent red-eye detection algorithm delivers an uneven number of red-eyes, additional processing can be applied, searching for rare cases of red-eye without accompanying specular reflection. One those extensions would examine the image along essentially horizontal bands around identified red-eyes.

The invention has been described with reference to preferred embodiments. It should be noted that sub-steps 2*b* through 2*f* might be re-arranged or in part omitted. Other modifications will occur to those of ordinary skill in the art to which the invention pertains upon reading and understanding of this specification. It is intended that the invention be construed as including all such modifications and alterations insofar as they come within the scope of the appended claims or the equivalents thereof.

Having thus described the preferred embodiments, what is claimed is:

1. A digital image processing method for identifying potential red-eye regions of a digital image, said method comprising:

receiving a digital image defined by a plurality of pixels;

locating regions of interest within said digital image that include pixels that represent a specular reflection; and, identifying each region of interest as a potential red-eye region;

wherein said step of locating regions of interest in said digital image comprises:

examining luminance-chrominance data for each pixel of said digital image;

identifying a group of adjacent pixels of said digital image as a potential specular reflection if said group of adjacent pixels comprises pixels having luminance-chrominance characteristics of a specular reflection;

for each identified potential specular reflection, determining at least one geometric attribute of said potential specular reflection;

comparing the at least one geometric attribute of said potential specular reflection to a desired geometric attribute; and, identifying said potential specular reflection as a specular reflection if said at least one geometric attribute conforms to said desired geometric attribute.

2. The digital image processing method as set forth in claim 1, further comprising, before said step of examining luminance-chrominance data, converting each of said pixels of said digital image to a luminance-chrominance color space.

3. The digital image processing method of claim 1, wherein the at least one geometric attribute of the potential specular reflection is at least one of a size and shape of said potential specular reflection.

4. The digital image processing method as set forth in claim 1, further comprising, for each potential specular reflection:

determining a brightness gradient of said potential specular reflection;

comparing said brightness gradient of said potential specular reflection to a select brightness gradient threshold; and, identifying said potential specular reflection as a specular reflection if said at least one geometric attribute conforms to said desired geometric attribute and said brightness gradient is greater than said brightness gradient threshold.

5. A method for detecting red-eye in a digital image, said method comprising:

receiving digital image data defining a digital image;

identifying regions of interest in said digital image that include data that represent a specular reflection, wherein said step of identifying regions of interest comprises, for each region of an image: identifying said region as including a specular reflection if said region includes a sub-region defined by at least one preset geometric attribute, a luminance above a select luminance threshold, and a luminance gradient above a select luminance gradient threshold;

examining the data in each of said regions of interest to detect red-eye.

6. The red-eye detection method as set forth in claim 5, wherein said at least one preset geometric attribute comprises at least one of a preset size and a preset shape.

7. A method of detecting red-eye in a digital image, said method comprising:

receiving a digital image;

identifying all regions of said digital image that include a specular reflection;

for each region of an image including a specular reflection, determining if said region includes red-eye based upon a color of said region adjacent said specular reflection;

wherein said step of identifying all regions of said digital image including a specular reflection comprises:

identifying all regions of said image including a potential specular reflection;

determining a geometric attribute of said potential specular reflection;

comparing said geometric attribute to a desired geometric attribute; and, identifying said region as a region including a specular reflection if said geometric attribute conforms to said desired geometric attribute.

8. The method as set forth in claim 7, wherein said step of determining a geometric attribute comprises determining at least one of a size attribute and a shape attribute, and wherein said comparing step comprises comparing said geometric attribute to a desired size attribute and shape attribute, respectively.

9. The method as set forth in claim 7, further comprising:

determining a luminance and a chrominance of said potential specular reflection;

comparing said luminance to a luminance threshold;

comparing said chrominance to a chrominance range;

identifying said region as a region including a specular reflection if said geometric attribute conforms to said desired geometric attribute, said luminance is greater than said luminance threshold, and said chrominance is within said chrominance range.

10. The method as set forth in claim 9, further comprising:

determining a luminance gradient of said potential specular reflection;

comparing said luminance gradient to a luminance gradient threshold; and, identifying said region as a region including a specular reflection if said geometric attribute conforms to said desired geometric attribute, said luminance is greater than said luminance threshold, said chrominance is within said chrominance range, and said luminance gradient is above said luminance gradient threshold.

11. The method as set forth in claim 10, wherein said step of determining a luminance gradient comprises a subtraction operation to determine a rate of change of luminance for said potential specular reflection.

* * * * *